(12) United States Patent
Johnson et al.

(10) Patent No.: US 6,929,540 B2
(45) Date of Patent: Aug. 16, 2005

(54) AUTOMATED CLASSIFIER AND MEAT CUT FAT TRIMMING METHOD AND APPARATUS

(75) Inventors: John E. Johnson, Jefferson, SD (US); Chris Vandenbroek, Beverly Hills, MI (US)

(73) Assignee: Tyson Fresh Meats, Inc., Springdale, AR (US)

( * ) Notice: Subject to any disclaimer, the term of this patent is extended or adjusted under 35 U.S.C. 154(b) by 0 days.

(21) Appl. No.: 10/709,582

(22) Filed: May 14, 2004

(65) Prior Publication Data

US 2005/0079814 A1 Apr. 14, 2005

Related U.S. Application Data

(62) Division of application No. 10/605,294, filed on Sep. 19, 2003.

(51) Int. Cl.[7] ............................................. A22C 17/00
(52) U.S. Cl. ..................................... 452/134; 452/150
(58) Field of Search ............................... 452/125, 127, 452/134, 135, 136, 150, 156, 157, 171

(56) References Cited

U.S. PATENT DOCUMENTS

| | | |
|---|---|---|
| 3,546,737 A | 12/1970 | Neebel et al. |
| 3,613,154 A | 10/1971 | Townsend |
| 3,789,456 A | 2/1974 | Doerfer et al. |
| 3,940,830 A | 3/1976 | Anderson et al. |
| 4,209,878 A | 7/1980 | Albert et al. |
| 4,246,837 A | 1/1981 | Chenery |
| 4,628,806 A | 12/1986 | Murphy |
| 4,718,146 A * | 1/1988 | Adkison ...................... 452/152 |
| 4,939,574 A | 7/1990 | Petersen et al. |
| 4,962,568 A * | 10/1990 | Rudy et al. .................. 452/157 |
| 4,970,755 A | 11/1990 | Leblanc |
| 4,979,269 A | 12/1990 | Norrie |
| 5,090,939 A | 2/1992 | Leblanc |
| 5,429,548 A | 7/1995 | Long et al. |
| 5,476,417 A | 12/1995 | Long et al. |
| 5,580,306 A | 12/1996 | Young et al. |
| 5,738,577 A | 4/1998 | Long |
| 5,902,177 A * | 5/1999 | Tessier et al. .............. 452/156 |
| 6,104,966 A | 8/2000 | Haagensen |
| 6,129,625 A | 10/2000 | Cate et al. |
| 6,155,919 A * | 12/2000 | Haagensen et al. ......... 452/171 |

(Continued)

FOREIGN PATENT DOCUMENTS

EP 0 411 743 2/1991

(Continued)

*Primary Examiner*—Peter M. Poon
*Assistant Examiner*—David Parsley
(74) *Attorney, Agent, or Firm*—Blackwell Sanders Peper Martin LLP; Mark E. Stallion

(57) ABSTRACT

Apparatus and method for a meat cut classification and fat trimming for sensing the thickness of a layer of fat of a cut of meat and the various contours thereof as it travels along a conveyance and providing the fat thickness or classification information to a downstream system for performing a fat trimming operation. The meat cut classification system comprises a split/multi-belt conveyor having split/multi-belts proximately spaced apart extending in the same direction and having a uniform equidistant gap there between and said conveyor having a drive for conveying the meat cut through the classification system and a multi-probe mechanism assembly.

7 Claims, 13 Drawing Sheets

U.S. PATENT DOCUMENTS 6,277,019 B1    8/2001    Veldkamp et al.
6,558,242 B2    5/2003    Veldkamp et al.

FOREIGN PATENT DOCUMENTS

| EP | 0 422 877 A2 | 4/1991 |
| EP | 0550379 * | 7/1993 |
| EP | 0 484 933 B1 | 8/1994 |
| EP | 0 402 877 B1 | 9/1996 |
| WO | WO 9402803 | 2/1994 |
| WO | WO 0178515 | 10/2001 |

* cited by examiner

AUTOMATED CLASSIFIER AND MEAT CUT FAT TRIMMING METHOD AND APPARATUS

CROSS REFERENCE TO RELATED APPLICATIONS

This patent application is a divisional application of U.S. patent application Ser. No. 10/605,294 filed Sep. 19, 2003, currently pending

BACKGROUND OF INVENTION

1. Field of Invention

This invention relates generally to methods for processing meat cuts and, more particularly, to an apparatus and method for trimming fat from a meat cut.

2. Background Art

The contour of the fat/lean on a beef strip as well as on other meat cuts is erratic and testing has shown no correlation. Therefore humans need to physically remove the thick fat cover from the beef strip and similar cut of meat. The fat is extremely difficult to cut due to the thickness of the fat layer and meat cut and due to the cold temperature. A significant number of people are needed to do this trimming, and due to the physical stress involved with making the cut, the trimming process can often lead to repetitive strain injuries. Also, a downgrade of product is possible if a mis-cut is made due to the fact that an operator must "guess" at the location of the fat/lean interface.

Work has been done to develop fat trimming devices where the fat would be "machined" off the top of the cut with spinning cutters. The cutters perform poorly and do not accurately address the incurring problems such as; ridges of fat, pulling fat into the cutting tools, stalling the equipment and cutting into the lean. Some plants have tried devices where the trimming device only cuts with a fixed blade. Fixed blades are not effective due to variations in the fat thickness and contour from one meat cut to another. Also, special devices have been used to reduce forces encountered by a worker's hand, wrist, and arm when cutting with a straight knife to eliminate strain injuries.

The greatest disadvantage of using other machines is the variable profile of the fat/lean interface for a meat cut particularly that of the beef strip meat cut. Further, human cutting cannot determine the fat/lean interface until after the lean has been cut which may down grade the product.

SUMMARY OF INVENTION

The present invention is a meat cut classification and fat trimming method and apparatus for sensing or classifying the thickness of a layer of fat of a cut of meat and the various contours thereof as it travels along a conveyance path and providing the fat thickness or classification information to a downstream system for performing a fat trimming operation. The classification information that can be gathered by a series of probes can be provided as a continuous function three-dimensional map of the fat/lean interface contour. The meat cut classification and trimming system comprises a split/multi-belt conveyor having co-planar split/multi-belts proximately spaced apart and co-planar extending in the same direction and having a uniform equidistant end to end gap there between such that they are laterally aligned and said conveyor having a drive for conveying the meat cut through the classification system and a multi-probe mechanism assembly operable to position the probes between the multi-belts of the conveyor and extend the probes up-ward between the multi-belts to penetrate the meat cut for measuring the fat thickness. The probe assembly is further operable to translate in a direction and at a velocity that is synchronized with the direction and velocity of the meat cut being conveyed.

The meat cut classifier system can be positioned such that the multi-belt conveyor can receive incoming meat cuts from an upstream conveyor or other input means. The classifier system can have a sensor operable to sense when the first end of the meat cut arrives on the conveyor belts. When the first end is sensed the probe mechanism is translated from the home position and the translation direction and speed is synchronized with the trace of the meat cut upon insertion into the meat cut.

The probe can be an elongated instrument having a somewhat pointed end portion such that when it is pressed against the meat cut penetration occurs into the fat layer and extends through the fat to lean transition. The probe can be instrumented with a sensor that can determine when the probe extends through the fat to lean interface as well as instrumented with a linear encoder for sensing the amount of extension of the probe or the fat layer depth. The probe is further operable to send a signal representative of the fat thickness or the location of the fat to lean interface. Multiple probe insertions into the meat cut are utilized to gather multiple data points for creation of a continuous function three dimensional (3D) map.

This device can utilize optical probing or other probing technology to determine the fat/lean interface on a meat cut such as a beef strip loin. Multiple laterally aligned probes can be utilized to repetitively penetrate the meat cut. The output signal can be processed by a controller to form a map of the fat to lean interface contour. The controller then articulates the cutting blades to follow the fat/lean interface map. Other probing technologies could be utilized such as sonar and rf sensing.

There are several advantages to the present invention. One advantage is that the beef strip meat cuts are fed into the machine continuously and the probing devices are multiple in effect. Multiple probes ensure a better "mapping" of the profile since there is little consistency or correlation for the fat/lean contour from one beef strip to another beef strip. Another advantage is that the meat cut is mechanically secured and fed through the machine with a conveyor on the bottom side and an overhead hold-down conveyor on top. This method of movement provides constant movement of the product in a secured manner. A third advantage is controlled blades that are capable of following a three-dimensional fat/lean interface map. The present method and apparatus can be utilized for meat cuts other than the beef strip to determine the contour of a fat/lean interface.

These and other advantageous features of the present invention will be in part apparent and in part pointed out herein below.

BRIEF DESCRIPTION OF DRAWINGS

For a better understanding of the present invention, reference may be made to the accompanying drawings in which.

DETAILED DESCRIPTION

Figure 1:
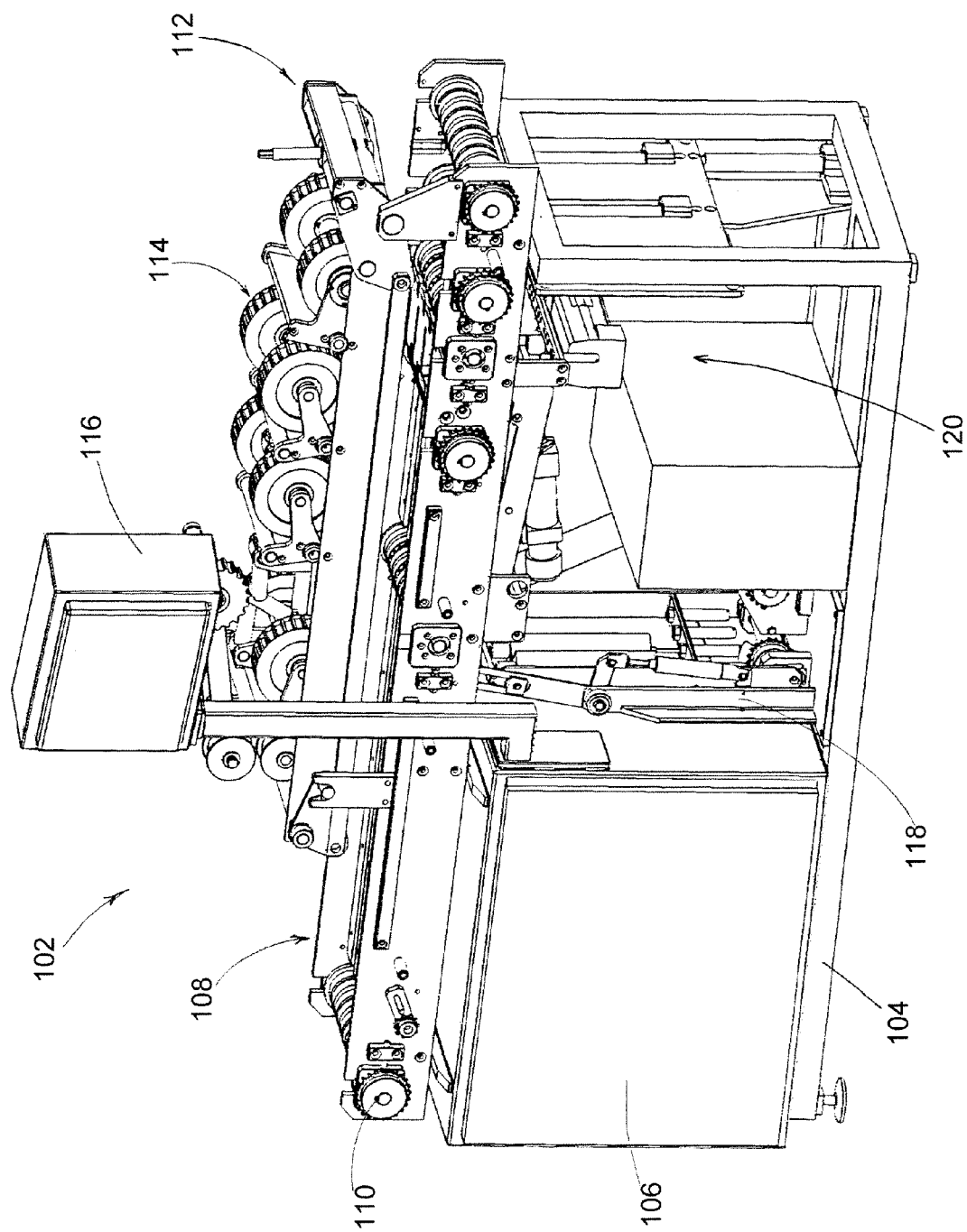
FIG. 1 is a front-right side isometric view of a classification and fat trimming system.

According to the embodiment(s) of the present invention, various views are illustrated in FIGS. 1–11 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

The details of the invention and various embodiments can be better understood by referring to the figures of the drawing. Referring to FIG. 1 a right side isometric view of the meat cut classification and trimming system 102 is shown. The meat cut classification and trimming system comprises the five major components including a main frame assembly 104, a drive assembly 120, a probing assembly 118, a conveyor assembly with blade assembly 108 and a spring loaded meat hold down upper conveyor assembly 112. The main frame assembly 104 is adapted such that the other major assemblies can be mounted thereon and can be installed in line with an existing meat cut conveyance system. The drive assembly includes at least one drive or motor for driving the plurality of pulley mechanisms. A single drive can be utilized to drive the various components in synchronization or multiple drives can be utilized and may or may not be synchronized.

One embodiment of the present invention comprises a split/multi-belt conveyor having multiple co-planar belts proximately spaced apart extending in the same direction and having a uniform lengthwise end to end equidistant gap there between and said conveyor having a drive for conveying the meat cut through the classification system and a multi-probe mechanism assembly operable to position the probes between the multi-belts of the conveyor and extend the probes upward between the multi-belts to penetrate the meat cut for measuring the fat thickness. The present invention teaches a novel apparatus and method for determining the contour of a lean/fat interface of a meat cut. The probe assembly is further operable to translate the probe in a direction and at a velocity that is with the direction and velocity of the meat cut being conveyed on split/multi-belt conveyor.

The classification station is downstream from a conveyor system operable to feed meat cuts to the classification station for classification of the meat cut based on the thickness and contour of the fat layer. The split/multi-belt conveyor of the classification station is positioned for receiving a meat cut from an upstream conveyor feed system onto the multi-belts of the conveyor system. The feed system can be any appropriate conveyance means such as a conveyor belt. When the meat cut is received on the multi-belts the meat cut is conveyed upstream along the path of conveyance to a point where it is detected by a sensor. When the sensor senses the presence of a meat cut, the probing and mapping can begin for classifying the meat cut.

Drive 120 drives the conveyor assembly with a pulley assembly. The conveyor assembly 108 comprises multiple endless conveyor belts, which are substantially coplanar and parallel along their lengths having end to end equidistant gaps therebetween and laterally aligned. The gaps allow the probes to extend upward therethrough to penetrate the meat cut. The conveyor assembly 108 further comprises a plurality of pulley assemblies for effecting conveyance of the conveyor belts as well as driving the multi-toothed conveyor chain, which is designed to grab the meat cut and pull it underneath the hold down assembly 112 downstream toward and into contact with the blades of the blade assembly. The conveyor assembly 108 has left and right side frame members for mounting the various conveyor assembly components. The hold down assembly 112 is mounted above the conveyor assembly. The hold down assembly also has a left and right side frame members for mounting the hold down assembly members thereon. The hold down assembly 112 is mounted to side frame members of the conveyor assembly.

When the presence of a meat cut is detected, upward elevation of the probe assembly is initiated along the substantially circular path which causes the probes to elevate upward and penetrate the oncoming meat cut. The probe assembly and probes, as they continue along the circular path, will then begin descent while continuing to translate along the path of conveyance. The descent along the substantially circular path will cause the probes to retract from the meat cut. The probe assembly frame and the probes will continue along the substantially circular path until the probes begin to elevate again to penetrate the meat cut. The speed of the motor or drive can be adjusted to penetrate the meat cut a plurality of time during a single pass. Increasing the drive speed, increases the number of penetrations of a given meat cut on a single pass. The preferred embodiment shows the laterally oriented probes operatively connected to air springs which act as a safety mechanism for a condition where the probe tip hits something hard such as a bone. The number of laterally aligned probes can vary to increase or decrease resolution of the map. The probes can also be longitudinally aligned or a matrix of probes can be utilized.

The probe assembly completes this cycle multiple times along the length of the meat cut thereby taking a plurality of measurements for the fat to lean interface along the length of the meat cut. This mechanism allows for multiple probe penetrations into the meat cut thereby gathering data to map the lean to fat interface contour. The probes can then communicate the data representative of the lean to fat interface to a controller which is operable to interpret the information and generate a signal responsive to the data or map of the contour that will vary the attack angle or angle of approach of the cutting blade to follow the contour of the lean to fat interface. Just prior to probing, the meat cut is engaged by a pulling chain having a plurality of teeth for grabbing the meat cut and pulling it along the path of conveyance while stabilizing the meat cut during the probing process. The controller can be operable to vary the position of a single blade element to follow the contour or can be operable to vary the position of multiple blade elements that are laterally aligned. The controller can be designed to independently vary each of the multiple elements each responsive to the contour map. The controller can also use an algorithm such as a smoothing function to vary the attack angle of the blades, which approximates the contour using the discrete data points captured by the multiple probes.

The pulling chain also grabs the meat cut and pulls it into engagement of the blade assembly. Also, just prior to probing, the meat cut is engaged by an endless conveyor track of a hold down assembly which applies a downward pressure to the meat cut and during the probing and cutting of the meat. The meat cut is held down by the track of the hold down assembly such that the probes can penetrate the meat cut without the meat cut being lifted from the conveyor. The track of the hold down assembly also conveys the meat cut from above at substantially the same speed as the conveyor. Optionally, to properly control the meat travel, the speed of conveyance of the hold-down assembly can be slightly faster or slower than the speed of conveyance of the lower multi-belt assembly.

The controller sends a signal representative of the fat to lean interface which will control the blade assembly to variably position the blade to follow the contour of the lean to fat interface. As indicated above, multiple blades can be utilized in order to conform more closely to the three-dimensional path or contour described by the fat/lean interface map. The blades do not necessarily correspond to a given probe, but is preferably designed to be controlled independent of a given probe to follow the contour of the map. The blade position can be controlled by an articulating arm. See Fig. The controller can send a signal responsive to the probe data to control an actuator which in turn controls the articulating arm for positioning the blade. The blade can be operatively mounted to the articulating arm such that it is spring loaded with a level of compliance. The blades are designed with a range to dive and climb. The blade can also be mounted such that a range of pitch is provided and such that a range of cutting depths is possible. The multiple blades are positioned based on the control signal received from the controller. The position of the blades are variably adjusted based on each set of mapped probing data. The blades are adjusted each time new data is gathered by the probe assembly. As the meat cut travels over the blade, thereby trimming the fat from the lean, the meat cut is then grabbed and conveyed by the secondary conveyor, and secondary grabbing chain and conveyed and pulled downstream on the downstream side of the blade. Once trimming is complete, the meat cut is conveyed off the exit end of the meat cut fat trimming system.

Referring again to FIG. 1, the meat cut classification and fat trimming apparatus 102 for sensing or classifying the thickness of a layer of fat of a meat cut is shown. The meat cut classification and fat trimming apparatus includes various major components. The apparatus has a frame 104 which supports the overall structure. Mounted on the frame 104 is an electronic and storage cabinet 106. Within the cabinet 106 are the electronics and computing capability for the controller function of the apparatus. Also provided in this cabinet is storage space for accessory tooling. The conveyor assembly 108 is mounted on the frame 104 and partially supported by the cabinet 106. The primary lower conveyor assembly 108 supports and it conveys the meat cut along the path of conveyance. The conveyor assembly 108 comprises multiple split belts that are multiple endless conveyor track belts that are coplanar and extend lengthwise in parallel along the path of conveyance. The multiple split belts have an end-to-end gap spacing between the belts that form a uniform equidistant end-to-end lengthwise gap between the split multiple belts. The splits or gaps between the belts provide an opening for probes to be extended upward through the gaps to penetrate the meat cuts being conveyed along the path of conveyance. The conveyor can simply be referred to as a split multi-belt conveyor. The conveyor assembly 108 also includes along a portion of its length a pull chain for grabbing and pulling the meat cut along the path of conveyance to engage the cutting blades. The apparatus 102 also includes an upper hold-down conveyor 112 for holding down the meat cut as it is being conveyed, probed and trimmed and further is to assist in the conveyance of the meat cut. The hold-down conveyor assembly 112 utilizes a plurality of track wheels 114 and an endless track (not shown) to apply a downward pressure to the meat cut and assist in conveying the meat cut along the path of conveyance. The fat trimming apparatus 102 is also equipped with a control panel 116 which allows the user to review probe data as well as provide adjustment inputs for adjusting the cutting blade. The trimming apparatus further includes a probe assembly 118 which includes a plurality of probes that penetrate the meat cut to sense the fat to lean interface. This configuration allows the meat cut to be probed and trimmed as it is continuously conveyed without temporarily stopping the meat cut along the path.

Figure 2:
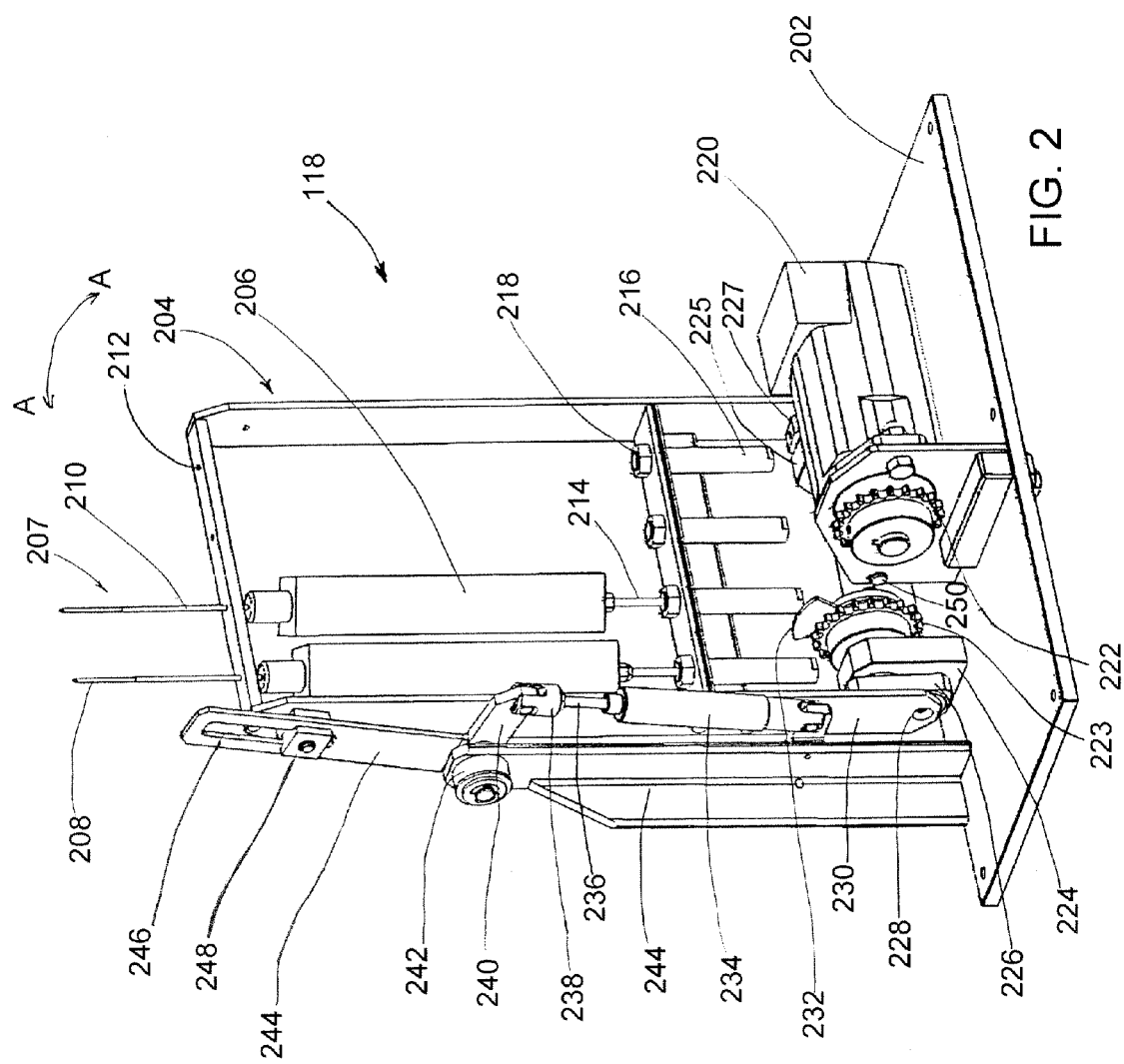
FIG. 2 is an isometric view of a probe assembly.

Referring to FIG. 2, the probe assembly 118 is shown. The probe assembly has a mounting base 202 on which the various components are mounted. Mounted on the base 202 is a probe motor assembly 220 which powers the probe assembly. The motor powers a sprocket wheel 222. Power is transferred from the first sprocket wheel 222 to a second sprocket wheel 223 by a pulley belt connected there between. The second sprocket 223 is rotatably mounted on support bearings 224 and 225. The support bearings 224 and 225 are mounted on the base 202. Transferring power to the second sprocket 223 affects rotation of the second sprocket 223. Also mounted to the base assembly 202 is a stabilizing bar 244, which provides stabilization for the probe form 204 and further provides a pivot point 242 for the probe frame.

The probes 206 are mounted in the frame 204 on plunger rods 214 which extend from shock absorbing safety springs 216. The probes 206 have probe leads 207 which further comprise a probe tip 208 and a probe base portion 210. The probe leads 207 extend upward through guide holes 212 of the frame 204. The probe assembly 118 is designed such that the probes 206 extend upward as a unit within the frame 204. The upward movement of the probes for penetration of the meat cut is affected by rotation of the second sprocket wheel 223. The sprocket wheel 223 affects rotation of the crank lift members 226 and 227. The lift members 226 and 227 lift the side bars 230 of the frame 204 such that the entire frame and probes are elevated upward as a unit such that the probes penetrate the meat cut. The bottom of the frame 204 travels in a circular motion. This results in a circular motion of the probe tips. However, the probe tips are free to tip forward along the path of conveyance or move along direction A—A in addition to the circular range of motion. The range of motion along A—A is made possible by the slotted swing arm 244. The swing arm 244 has a linear slot 246 and is connected to the frame 204 by a follower member 248 which is slidably mounted in slot 246. The swing arm 244 pivots about pivot point 242. The swing arm 244 has an extension 240 which is pivotally mounted in a slotted joint member 238.

The slotted joint member 238 is mounted to a plunger rod 236 extending from cylinder 234. The cylinder 234 is pivotally mounted on the opposing end to the stabilizing bracket 244. The probe frame 204 and therefore the probe tips 208 are free to move along direction A—A pivoting on pivot point 228 as long as there is no pressure in the cylinder 234. The cylinder 234 also does not cause upward movement of the probe frame 206, but only allows the probes to move along with the meat cut. Therefore, when the probe tips 208 penetrate the meat cut, the meat cut carries the probe tip along the path of conveyance as the meat cut is being conveyed. When the probe tips are fully retracted from the meat cut by virtue of the rotation of lift arm 226, the cylinder 234 pushes the probes back to an upstream position and then releases them such that the process can be repeated. However, when the probes are inserted into the meat cut the cylinder 234 exerts no force.

The paddle 232 mounted on the shaft of the second sprocket wheel 223 passes over a proximity switch 250 which tells the controller the position of the probes. This allows the systems controller to coordinate the probe movement with the meat travel as it is conveyed along the path of conveyance.

The probe assembly is designed such that the probes are inserted and retracted as a unit. The bottom of the probe bank travels in a circular motion as commanded by the controller system. However, the circular motion of the probe tips is not conducive for matching the continuous conveyance of the meat cut along the path of conveyance. As indicated above, the probe tips are free to move along direction A—A pivoting about point 228. This allows the meat cut to carry the probe tip along the path of conveyance during penetration. As the left arm continues its rotation it will retract probes from the meat cut and the cylinder 234 will push the probes as a unit back to an upstream position in order to repeat the process. The safety cylinders 216 or safety springs provide shock absorption in case the probe tip engages a hard structure, such as a bone, as it penetrates the meat cut. The paddle 232 which rotates along with the lift member provides an indication to the proximity switch 250 such that the controller recognizes the position of the probe. Therefore, the controller can control the position and speed of the probe in order to coordinate with the travel of the meat cut. The sequence is as follows:

The cylinder 234 is extended and relaxed to position the probes in the upstream start position.

The controller starts the motor assembly 220 which in turn turns the first sprocket wheel 222. Power or drive is transferred to the second sprocket wheel 223 which affects rotation of the lift arm which forces the probes up as a unit to penetrate the meat cut.

Linear travel of the meat cut along the path of conveyance pull the probe tips to follow along the path of conveyance and the cylinder 234, which is not activated, will collapse.

The paddle 232 provides an indication to the proximity switch 250 that will tell the controller the position of the probes such that the controller knows when the probes have retracted.

The cylinder 234 is fired briefly and released to return the probes as a unit the their start of position. The motor 220 stops and awaits the next meat cut.

Figure 2A:
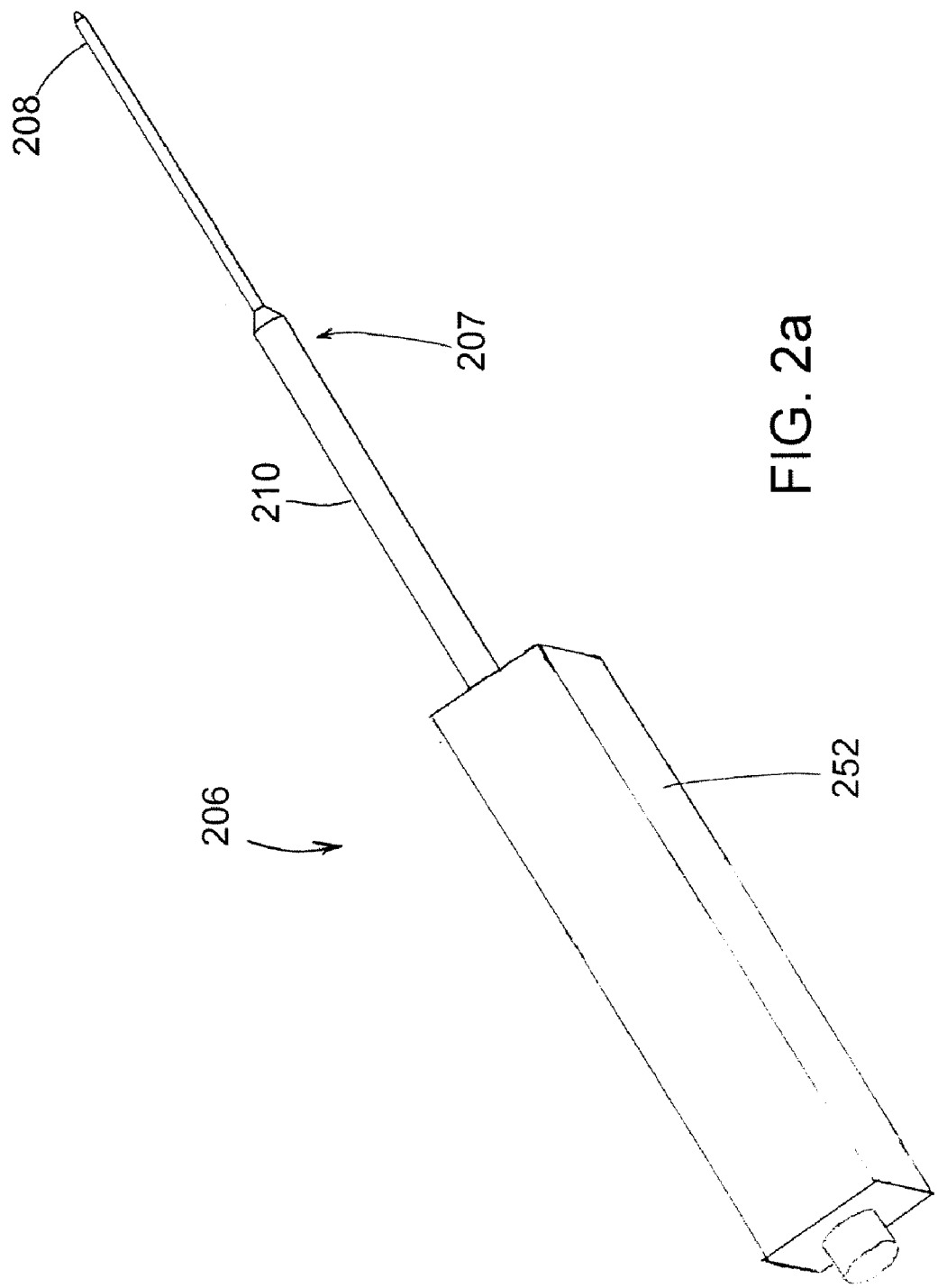
FIG. 2a is an isometric view of a probe.

Referring to FIG. 2a, an isometric view of a probe is shown. The probe includes an elongated member or probe lead 207 having a substantially pointed end for penetrating the meat cut. The probe also has a sensor assembly 252 for emitting and receiving sensor signals. The sensor assembly emits a signal through a window of the pointed end of the probe and receives a reflected signal from the meat cut for sensing the fat to lien interface. Optical Technology or infrared sensor technology can be utilized or any other appropriate sensor technology.

Figure 3:
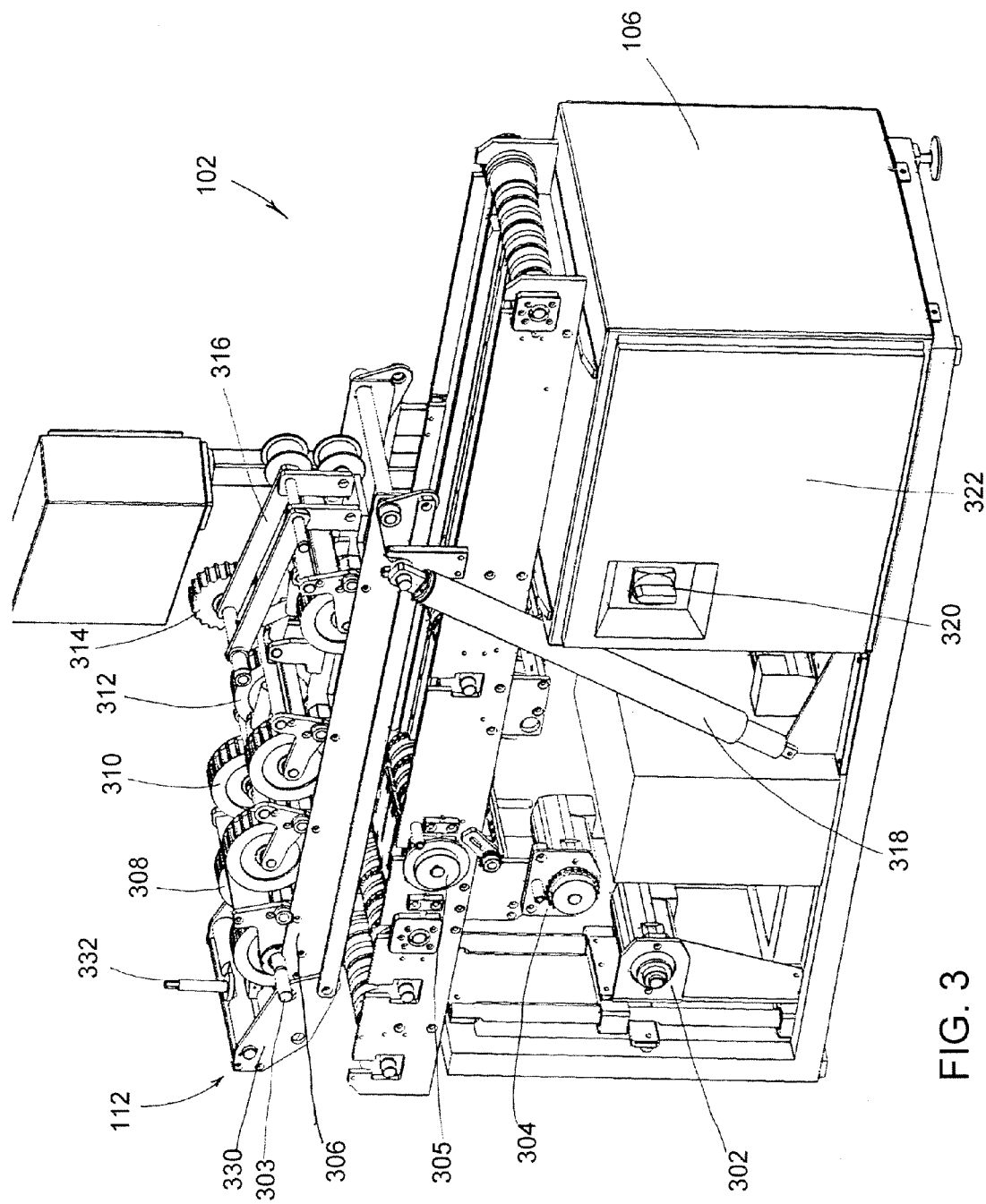
FIG. 3 is a rear-left side isometric view of a classification and fat trimming system.

Referring to FIG. 3 a rear left side isometric view of the trimming apparatus 102 is shown. This view reveals the two conveyor drives 302 and 304. Conveyor drive 304 drives the primary conveyor for conveying the meat cut towards the cutting blades along the path of conveyance. The second motor 302 drives the upper hold down conveyer, which pulls the meat cut on the downstream side of the cutting blade. This view also reveals the lift cylinder 318 which is operable to be actuated thereby lifting the hold-down conveyor assembly 112 upward to a position where the blades and the lower conveyor can be maintenanced. The hold-down conveyor assembly 112 has a frame assembly 306 on which the conveyor components are mounted. The hold-down conveyor comprises track wheels 308, 310, 312 and 314, which are adapted to apply downward pressure to the meat cut while being upwardly compliant to adapt to the various size meat cuts. Track wheel 314 is rotatably attached to tension arms 316. The tension arm 316 can be elevated and lowered to vary the tension in the endless track (not shown) of the hold-down conveyor. This view also reveals the left side of the electronics and storage cabinet 106. An access door 322 is shown having a latch 320.

The main lower conveyor drive 304 transfers drive via a pulley assembly to the lower drive input shaft 305 for driving the main lower conveyor. The upper hold-down conveyor drive 302 transfers drive via a pulley assembly to the upper hold-down conveyor drive shaft 303 for driving the hold down conveyor. The upper hold down conveyor frame assembly 306 has a height adjustment carriage 330 and a jack screw adjustment rod 332. Raising and lowering one end of the carriage with the adjustment rod 332 causes the frame flex about the junction between the carriage portion and the main portion of the frame 306.

Figure 4:
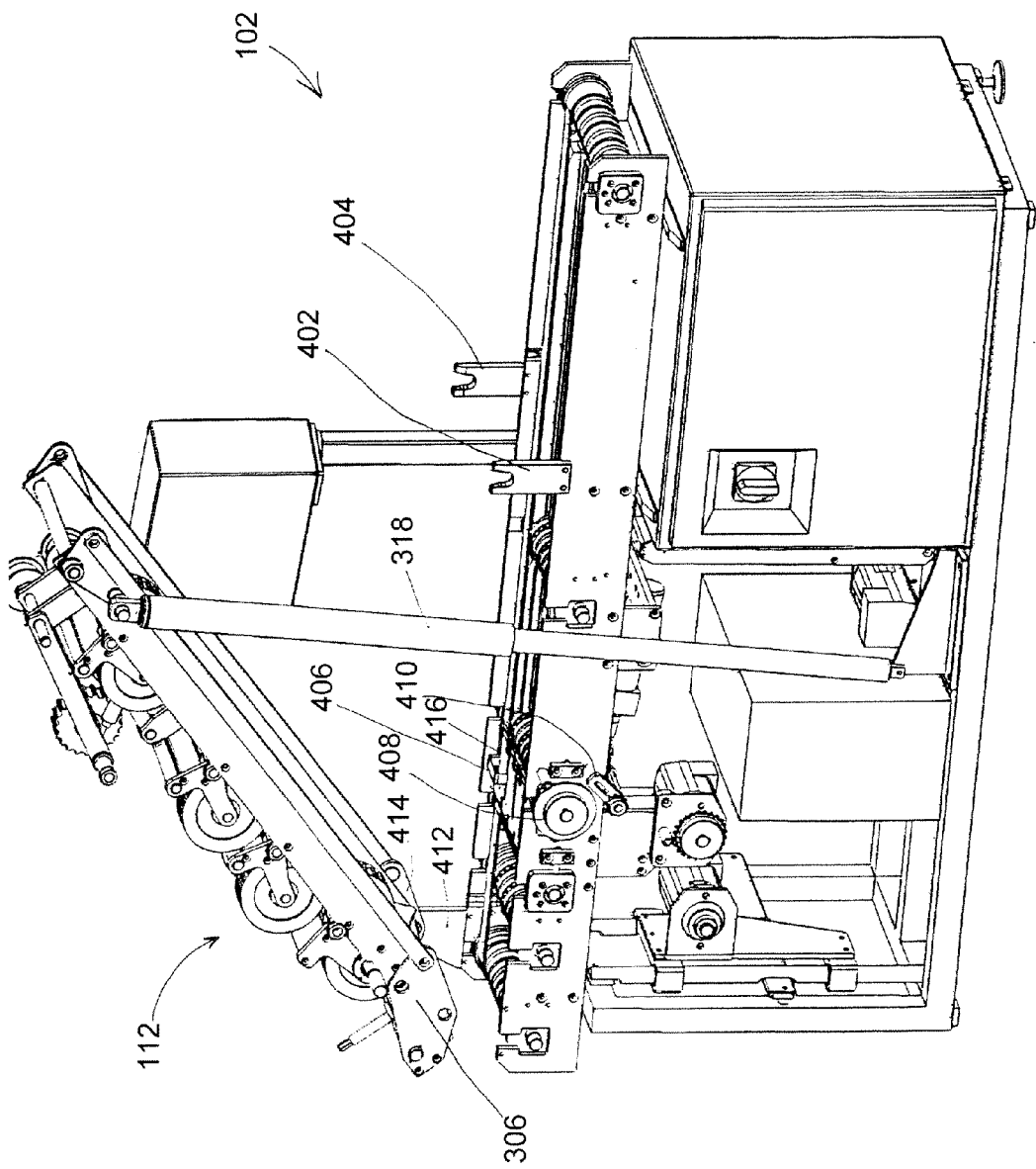
FIG. 4 is a rear-left side isometric view of a classification and fat trimming system with the upper hold-down conveyor in a raised maintenance position.

Referring to FIG. 4, a rear left side isometric view of the trimming apparatus 102 is shown with the hold-down conveyor assembly 112 raised to the maintenance position. The cylinder 318 is actuated to extend upward thereby raising the hold-down conveyor assembly 112 to the maintenance position. The hold-down conveyor assembly 112 pivots upward about a junction between the pivot brackets 412 and 414. The hold-down conveyer raised to the maintenance position reveals the position of the blade 406. The blade 406 is positioned in-line with one of the split multiple belts 416. When the hold-down conveyor assembly 112 and the frame 306 of the hold-down assembly is lowered to the operating position, the assembly will be partially supported by standoffs 402 and 404.

Figure 5:
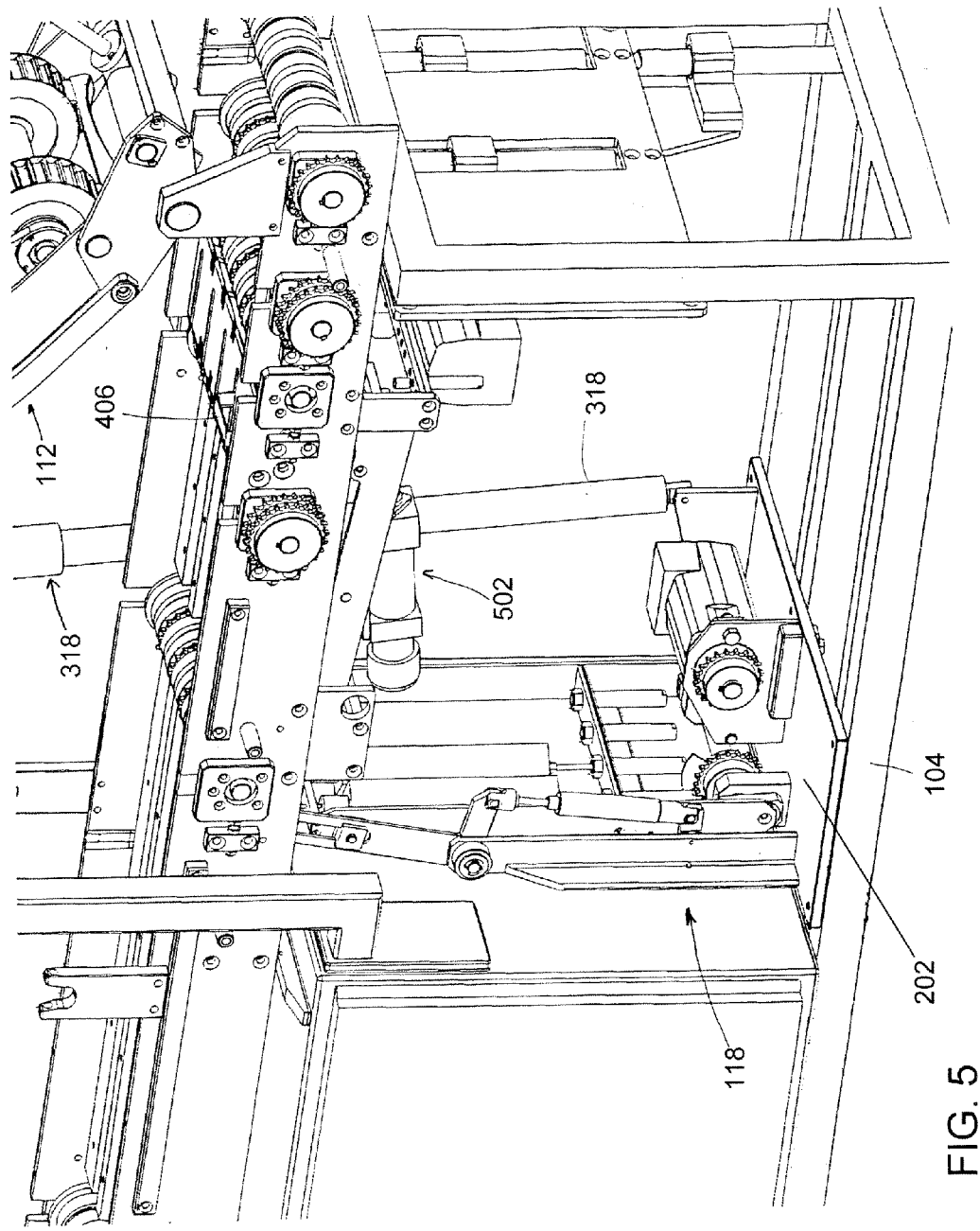
FIG. 5 is a front-right side isometric blown up view of a classification and fat trimming system focusing on the probe and blade assemblies.

Referring to FIG. 5, a front right side enlarged isometric view of the meat cut trimming system is shown. The system is shown with the hold-down conveyor assembly 112 lifted upward by cylinder 318 to its maintenance position. One cutting blade 406 is shown installed. However, there are positions for three other blades. The cutting blade assembly 502 is shown mounted beneath the split multiple belts. The probe assembly base 202 is also shown mounted to the frame 104.

Figure 5A:
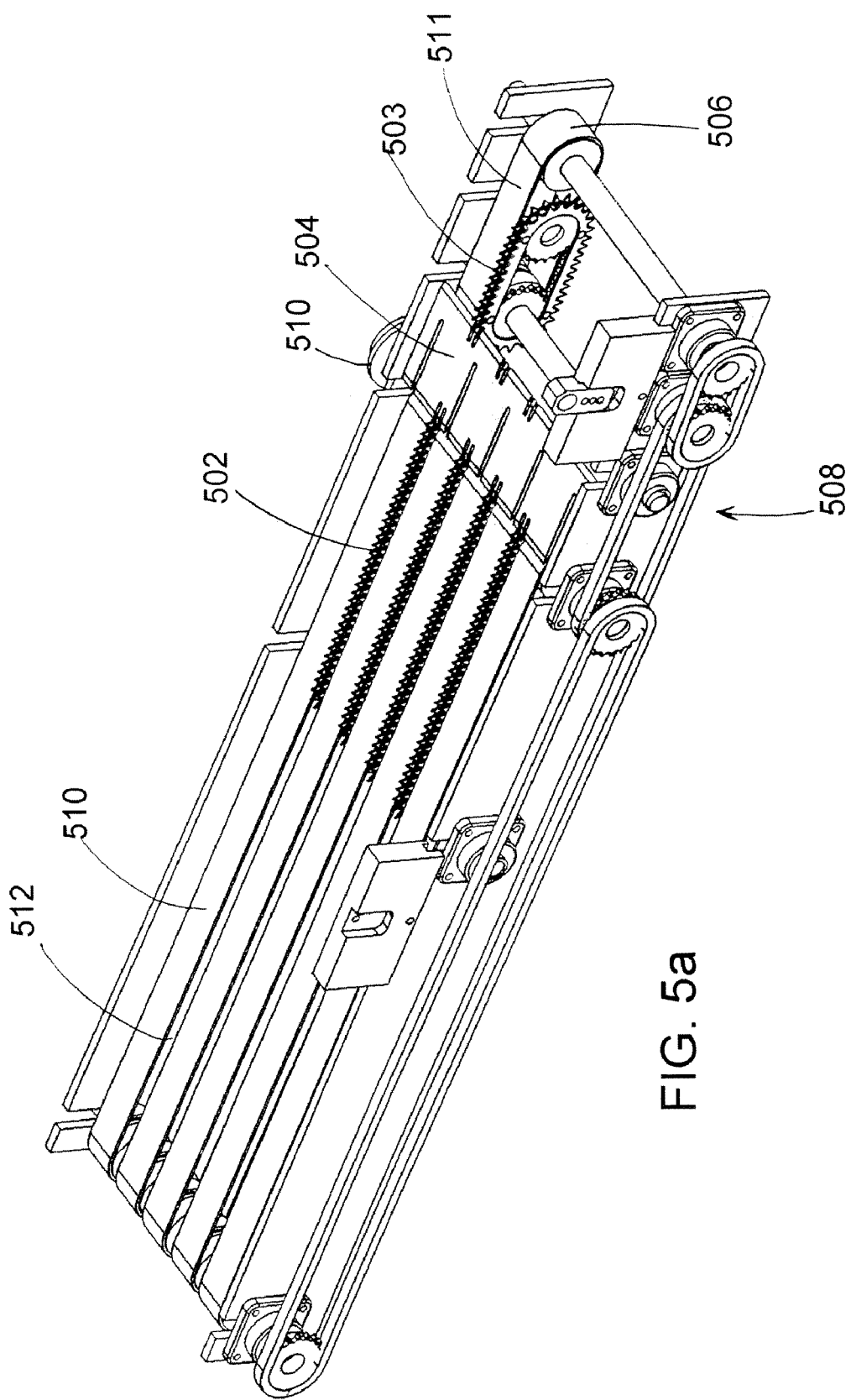
FIG. 5a is an isometric view of the split/multi belt conveyor.

Referring to FIG. 5a a front-right side isometric view of the split/multi-belt conveyor assembly is shown. The split/multi-belt conveyor assembly comprises multiple belts 510 having gaps 512 therebetween. The gaps between the belts allow the probe to extend upward there through in order to penetrate the meat cut. The preferred embodiment shown in FIG. 5a also comprises multiple grabbing chains 502 extending along a portion of the gap extending between the multiple belts of the conveyor upstream of the cutting blades and grabbing chains 503 downstream of the cutting blades. The chains having a plurality of teeth are utilized to grab the meat cut in order to convey and pull the meat cut through the trimming blade for trimming the fat.

The preferred embodiment shown in FIG. 5a shows a secondary split/multi-belt conveyor 511 on the other side of the blade assembly for conveyance of the meat cut after the fat has been trimmed therefrom. The secondary split/multi-belt conveyor also comprises multiple belts having gaps extending there between. Also extending along the gap are grabbing chains 503 having a plurality of teeth for grabbing and pulling the meat cut as it extends to the other side of the cutting assembly. The primary and secondary split/multi-belt conveyors are driven by the same drive such that the speed of conveyance is the same. The drive is transferred to the split/multi-belt conveyors and the drive chains by a series of pulley mechanisms. The blade assembly is positioned between the primary and secondary split/multi-belts along the path of conveyance. The primary conveyor and chain conveys and pulls the meat cut into the cutting blades and the secondary conveyor and chain pulls the meat cut through on the downstream side of the blade. The cutting blades are designed to controllably adjust vertically, pitch, and dive responsive to the contour sensed by the probe assembly. A single blade can be utilized which adjusts to some medium or average position based on data from the multiple probes. Preferably, however, multiple blades are utilized to allow a more accurate cut dictated by the fat/lean interface map.

Figure 6:
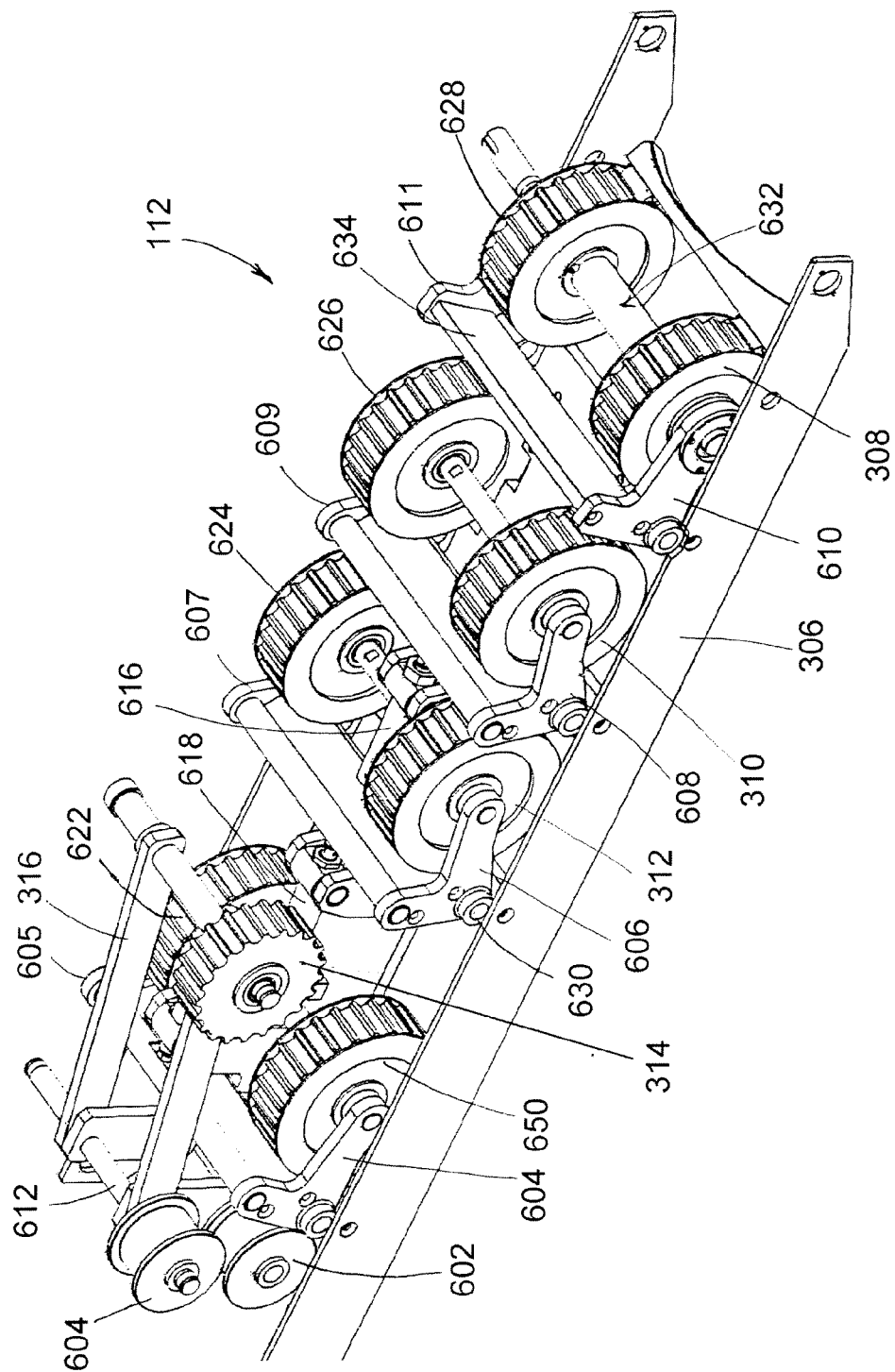
FIG. 6 is an isometric view of an upper hold-down conveyor assembly.

Referring to FIG. 6, an isometric view of the upper hold-down conveyor assembly 112 is shown. The hold-down conveyor assembly includes an endless conveyor track (not shown) which wraps around a plurality of spring-loaded track wheel members which vary the tension of the endless hold-down track and vary the downward pressure applied by the down-hold track to the meat cut. The track wheel 314 as discussed above, can be elevated or lowered to vary the tension in the endless track. The hold-down assembly further comprises multiple pairs of track wheels as identified my Item Nos. 620, 622, 312, 624, 310, 626, 308 and 628. The track wheels are rotatably mounted between multiple pairs of rocker arms as identified by Item Nos. 604, 605, 606, 607, 608, 609, 610 and 611.

The rocker arms are adapted to pivot about a pivot point such as pivot point 630. The spring-loaded rocking action of the rocker arms allows the tension being applied downwardly to the meat cut to be varied. The pairs of track wheels have their respective rocker arms connected by a shaft member such as item 632 about which the track wheels rotate. Each pair of elbow shaped rocker arms such as rocker arms 610 and 611, are attached by an axle bearing member such as Item 632, which extends between one end of the rocker arms. The opposing end of the rocker arms are attached by a shaft member such as item 634. The track wheels rotate about axle bearing members such as Item 632. The shaft such as shaft 634 is attached to a cylinder such as cylinder 616 and 618, such that the cylinders can controllably be extended or retracted, thereby causing the rocker arm to rock about a pivot member, such as pivot member 630. This allows the track wheels to increase or decrease the downward pressure applied to the meat cut as it is being conveyed. Track wheel 314 as discussed above acts as an idler to vary the tension of the endless track (not shown). FIG. 6a shows the upper hold down conveyor assembly with a cut away portion of the endless track shown.

Figure 7:
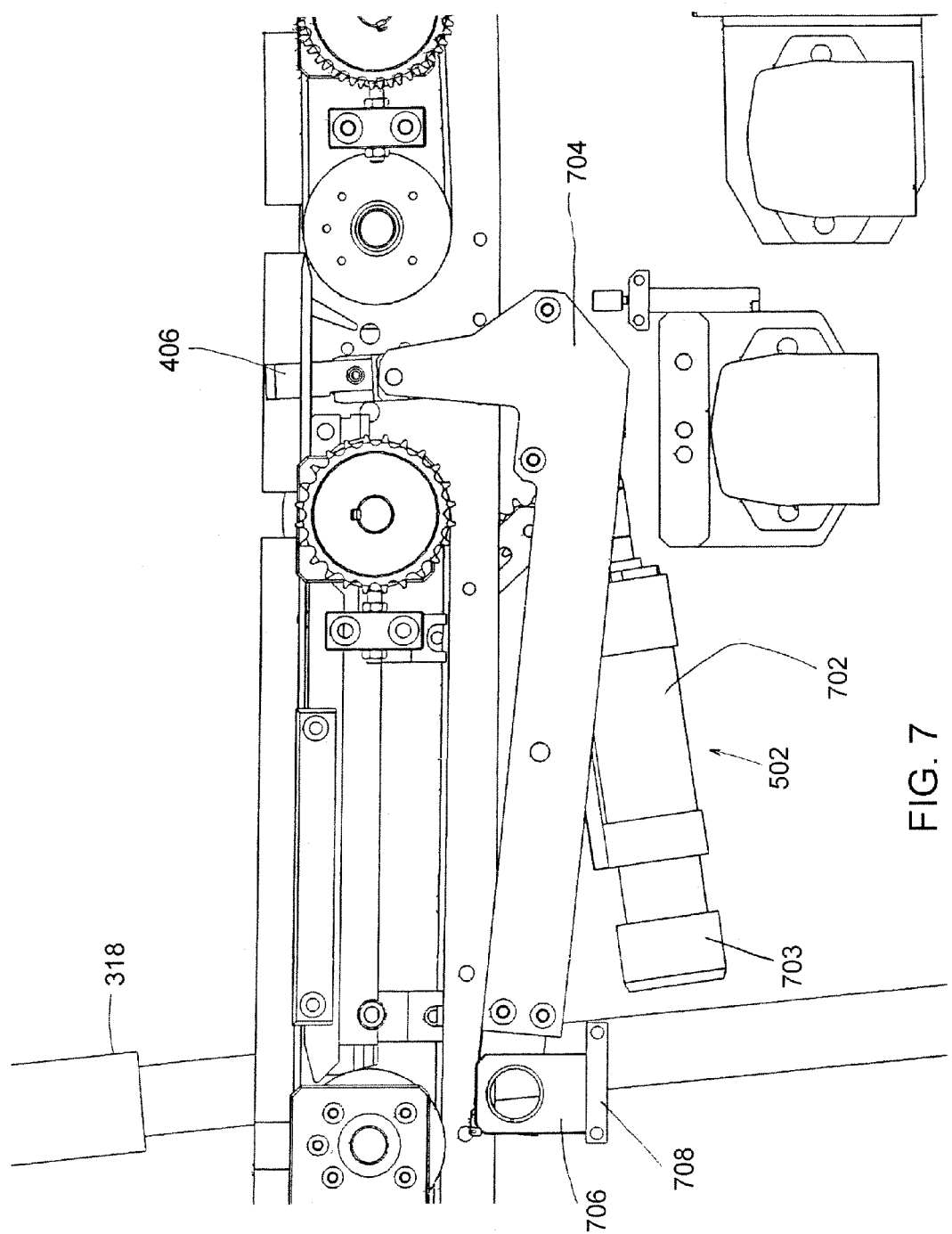
FIG. 7 is a side view of an installed blade assembly.

Referring to FIG. 7, a side view of a blade assembly 502 is shown. The hold-down conveyor assembly is elevated out of view by cylinder 318. Also portions of the lower conveyor have been cut away for a clear view of the blade assembly 502. The entire blade assembly pivots about clevice member 706 which is fixed in place by bracket member 708. The blade assembly further comprises a side bracket 704. A complimentary side bracket is mounted on the opposing side of the blade assembly. The blade assembly also comprises a cylinder 702 which controls the pitch of the blade 406.

Figure 8:
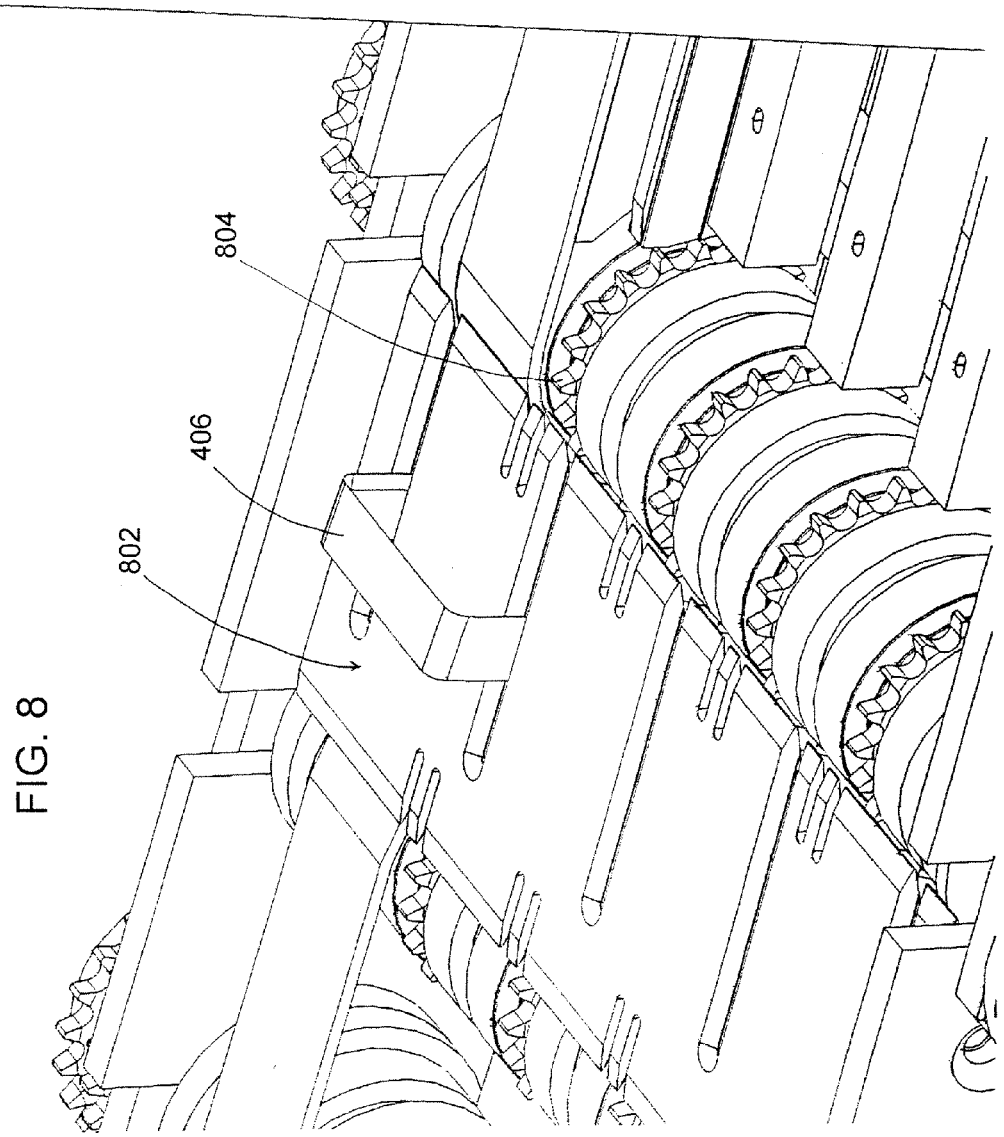
FIG. 8 is an isometric view of an installed blade.
Figure 9:
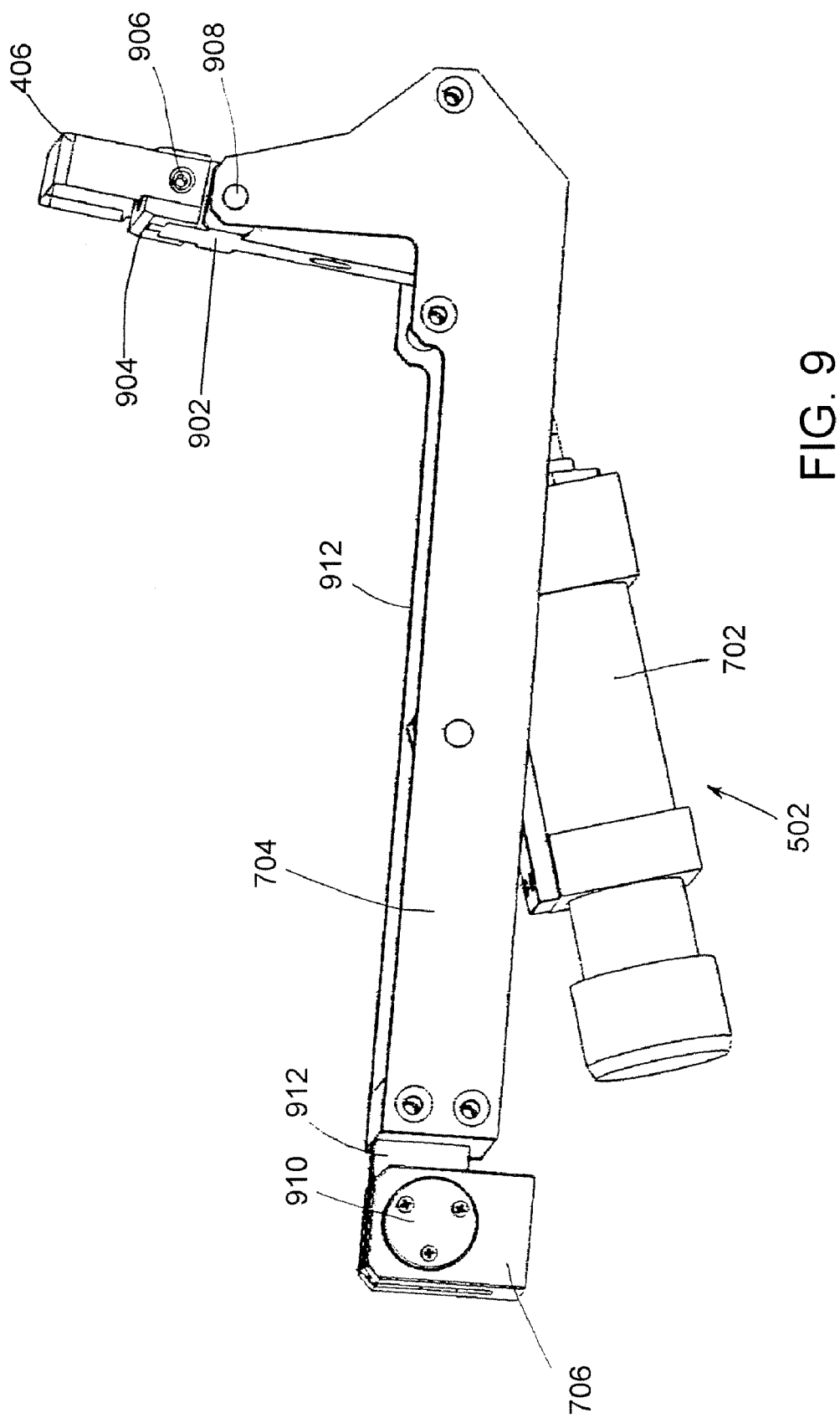
FIG. 9 is a stand alone isometric view of a blade assembly.

FIG. 8 shows an isometric blow-up of the blade 406. Also shown in this view are the chain sprocket wheels 804 which drive a chain that pulls the meat cut towards the blade for trimming the fat. Also shown in this view is a rigid plate assembly 802 which supports the meat cut from underneath as it is being trimmed by the blade 406. FIG. 9 shows a stand-alone isometric view of the blade assembly. Again, device member 706 is shown with a mounting plate 910 which rotatably mounts an extension 912 of the blade assembly to the clevice. The mounting plate 910 allows the entire blade assembly to rotate above the device member 706. Again, the blade assembly 502 includes side brackets 704 and 912. The cylinder 702 controls the pitch of the blade 406. Blade 406 is mounted at point 906 to a blade holder 904 which is slidably mounted to the blade arm 902. The blade arm 902 is pivotally mounted between the side brackets 912 and 704 at pivot point 908. Rotation of the blade arm 902 about pivot point 908 varies the pitch of the blade 406.

Figure 10:
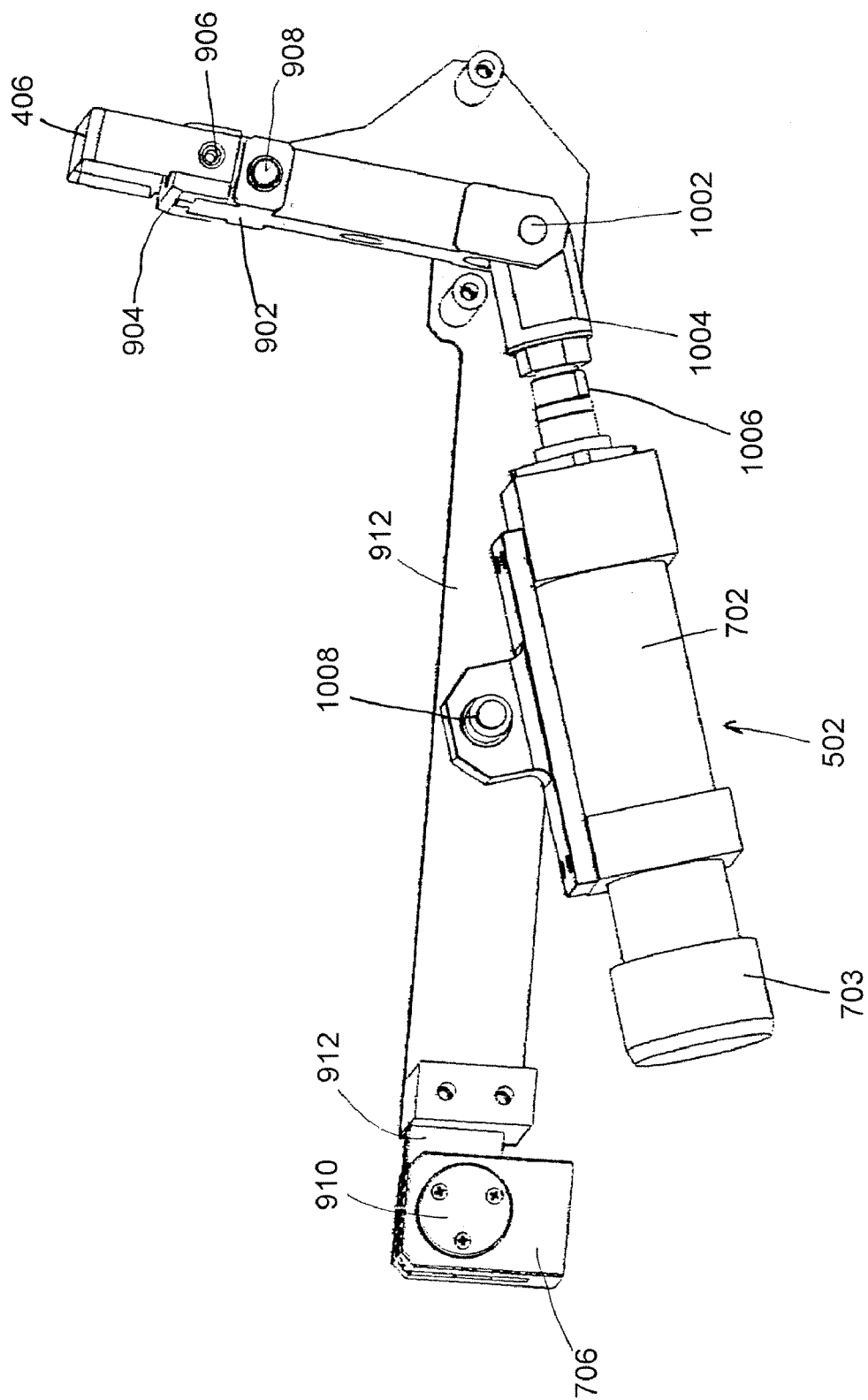
FIG. 10 is a stand alone isometric view of a blade assembly with a side frame removed.
Figure 11:
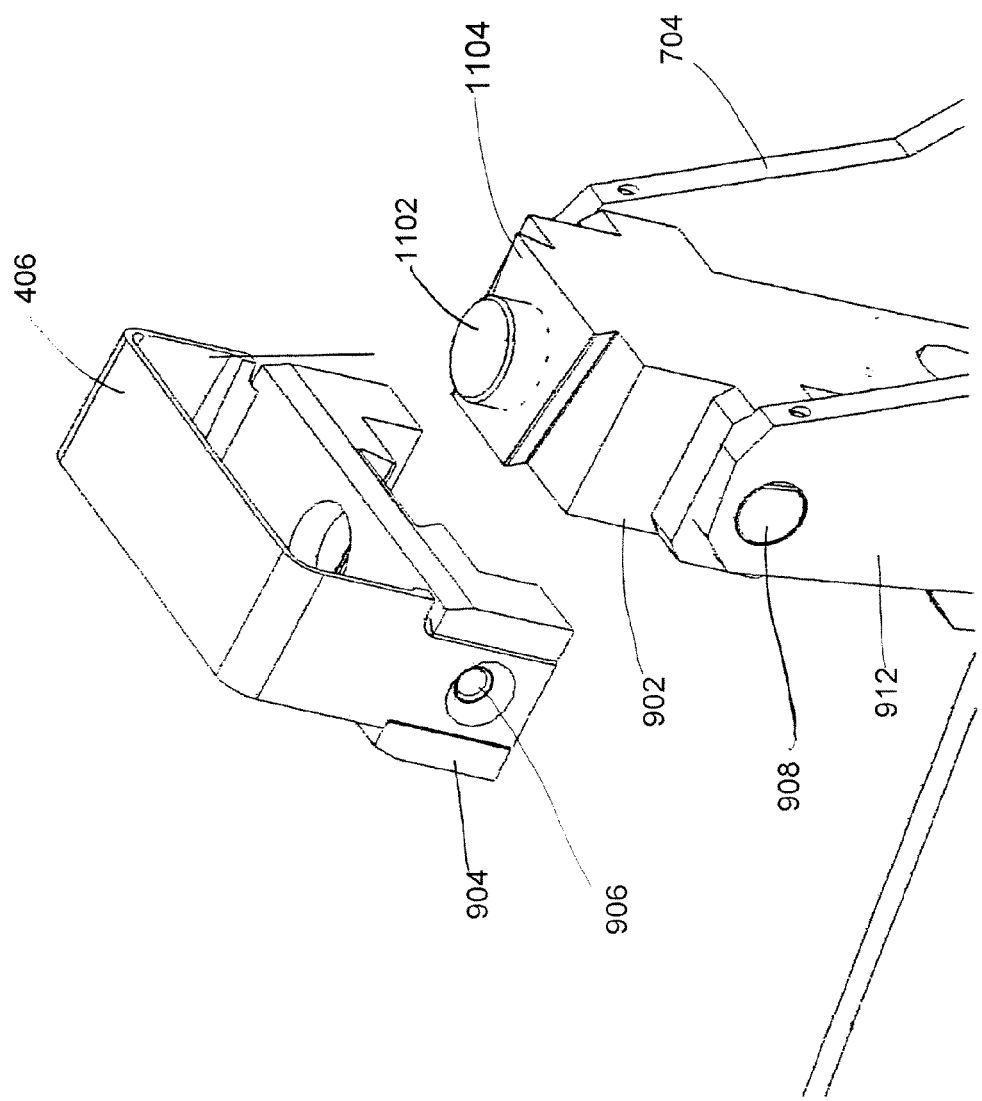
FIG. 11 is an isometric view of a blade, blade holder, and blade arm.

FIG. 10 is an isometric view of the blade assembly 502 with side plate 704 removed and thereby revealing the cylinder assembly 702. As mentioned previously, the entire blade assembly pivots about the device member 706. The blade assembly is mounted to the device member 706 by mounting plate 910 which attaches to extension 912. The mounting plate 910 allows the plate assembly to rotate about the device member. A rotary potentiometer can be utilized within the device member 706 such that the device pivot pin provides an indication to the contoller for the position of the blade. Further, the knife assembly can be rendered essentially weightless by the addition of a counter weight or hanging spring or an additional air cushion which would effectively render the blade assembly weightless. The pitch of the blade 406 is controlled by cylinder 702. The cylinder can include a linear precision transducer along with electronics and termination at 703 in order to have feedback on the blade pitch angle. The depth of the cut during trimming can be varied by controlling the pitch angle of the blade. The entire blade assembly elevates or lowers about a pivot point established by the device 706. In order to control the pitch angle of the blade 406 cylinder 702 can be actuated to extend plunger members 1006 and thereby extending joint member 1004. The joint member 1004 is pivotally mounted to the device end of the blade arm 902 at pivot point 1002. Extension and retraction of the plunger member 1006 causes the blade arm to pivot about pivot member 908 thereby varying the pitch angle of the blade 406. The action of cylinder 702 also causes the entire blade assembly to pivot about device member 706. FIG. 11 shows the quick release mechanism for the blade. FIG. 11 shows a spring loaded pin 1102 on the head of the blade arm 902 that may be depressed allowing the blade 406 and the holder 904 to be easily removed. The dove tail end 1102 of the blade arm 902 which holds the knife in place is tapered to allow the blade to be easily removed and reinstalled. This configuration allows the blade to be re-moved without tools. It also allows the blades to be re-moved without disturbing any adjacent blades.

The various fat trimming system examples shown above illustrate a novel method and apparatus for classification of a fat to lean interface of a meat cut and trimming the fat therefrom. A user of the present invention may choose any of the above embodiments, or an equivalent thereof, depending upon the desired application. In this regard, it is recognized that various forms of the subject invention could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A method for classifying a meat cut and trimming the fat therefrom comprising the steps of:
    conveying a meat cut along a split multi-belt conveyor having a plurality of proximately spaced conveyor belts extending in parallel along a path of conveyance having a plurality of uniform gaps there between;
    probing the meat cut with a probe assembly having a plurality of elongated laterally aligned probes operable to sense a fat to lean interface of the meat cut where each of said probes are aligned along one of the gaps;
    selectively driving the probe assembly with a drive effecting elevation and lowering of the probe assembly along a circular path for insertion and retraction of the probes;
    tipping the probe's tip forward along the path of conveyance with the conveyance of the meat cut during insertion in the meat cut; and
    sensing the fat to lean interface with the plurality of probes and outputting a plurality of signals from each probe characteristic of the fat to lean interface.

2. The method for trimming fat as recited in claim 1 further comprising the steps of:
    receiving the plurality of signals from each probe to a controller and controlling with the controller a blade assembly having a blade attached thereto to adjust the position of the blade responsive to the signal.

3. The method for trimming fat as recited in claim 1 further comprising the steps of:
    holding down and conveying the meat cut with a hold down assembly positioned above the multi belt conveyor where said hold down assembly has an endless hold down track powered by a hold down drive.

4. A method for classifying a meat cut and trimming the fat therefrom comprising the steps of:
    probing a meat cut with a probe assembly having a plurality of elongated laterally aligned probes operable to sense a fat to lean interface of a meat cut where each of said probes are aligned along one of a plurality of gaps between a plurality of proximately spaced conveyor belts;
    selectively driving the probe assembly with a drive effecting elevation and lowering of the probe assembly along a circular path for insertion and retraction of the probes;
    sensing the fat to lean interface of the meat cut being conveyed on the conveyor belts along a path of conveyance with the plurality of probes and outputting a plurality of signals from each probe characteristic of the fat to lean interface; and
    holding down the meat cut with an endless hold down track powered by a drive and operable to hold down and convey the meat cut during probing.

5. The method for trimming fat as recited in claim 4 further comprising the steps of:
    tipping the probe's tip forward along the path of conveyance with the conveyance of the meat cut during insertion in the meat cut.

6. A method for classifying a meat cut and trimming the fat therefrom comprising the steps of:
    probing a meat cut with a probe assembly having a plurality of elongated laterally aligned probes operable to sense a fat to lean interface of the meat cut where each of said probes are aligned along one of a plurality of gaps between a plurality of proximately spaced conveyor belts;
    selectively driving the probe assembly with a drive effecting elevation and lowering of the probe assembly along a circular path for insertion and retraction of the probes;
    sensing the fat to lean interface of the meat cut being conveyed on the conveyor belts with the plurality of probes and outputting a plurality of signals from each probe characteristic of the fat to lean interface; and
    controlling a blade assembly having a plurality of blade elements laterally aligned and each blade element aligned along one of the plurality of gaps along a path of conveyance downstream the probes, to adjust the cutting position of the plurality of blade elements responsive to the plurality of signals from the probe assembly characteristic of the fat to lean interface for trimming fat from the meat cut.

7. The method for trimming fat as recited in claim 6 further comprising the steps of:
    holding down and conveying the meat cut with a hold down assembly positioned above the multi belt conveyor where said hold down assembly has an endless hold down track powered by a hold down drive.

* * * * *

UNITED STATES PATENT AND TRADEMARK OFFICE
CERTIFICATE OF CORRECTION

| | |
|---|---|
| PATENT NO. | : 6,929,540 B2 |
| APPLICATION NO. | : 10/709582 |
| DATED | : August 16, 2005 |
| INVENTOR(S) | : John E. Johnson et al. |

It is certified that error appears in the above-identified patent and that said Letters Patent is hereby corrected as shown below:

On the title page: Item
(56) References Cited; insert - - 6,089,968  07/2000  Andre, et al. - -
Col. 1, line 67, delete "up-ward" and replace with - - upward - -;
Col. 5, line 30, after the word *FIG.* insert - - 9 - -;
Col. 10, line 14, delete "device" and replace with - - clevice - -;
Col. 10, line 17, delete "device" and replace with - - clevice - -;
Col. 10, line 28, delete "device" and replace with - - clevice - -;
Col. 10, line 29, delete "device" and replace with - - clevice - -;
Col. 10, line 32, delete "device" and replace with - - clevice - -;
Col. 10, line 33, delete both instances of "device" and replace with - - clevice - -;
Col. 10, line 34, delete "contoller" and replace with - - controller - -;
Col. 10, line 45, delete both instances of "device" and replace with - - clevice - -;
Col. 10, line 49, delete both instances of "device" and replace with - - clevice - -;
Col. 10, line 54, delete both instances of "device" and replace with - - clevice - -;
Col. 10, line 61, delete "re-moved" and replace with - - removed - -; and
Col. 10, line 62, delete "re-moved" and replace with - - removed - -.

Signed and Sealed this

Eighth Day of August, 2006

JON W. DUDAS
*Director of the United States Patent and Trademark Office*